(No Model.)
F. SULZBERGER.
METHOD OF AND APPARATUS FOR RENDERING FATS, &c.
No. 262,706.　　　　　　　　　　Patented Aug. 15, 1882.
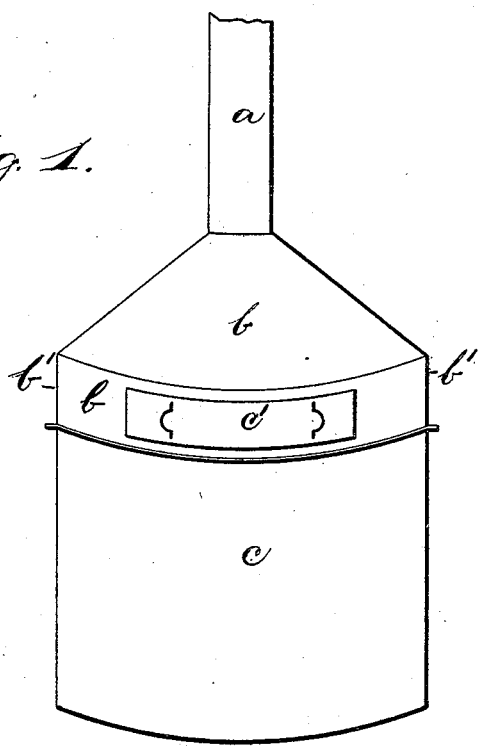
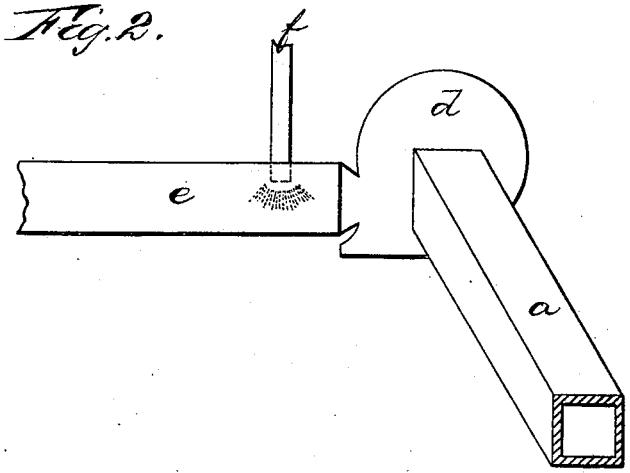
WITNESSES:　　　　　　　　　　INVENTOR
　　　　　　　　　　　　Ferdinand Sulzberger
　　　　　　　　　　　by Wetmore Jenner
　　　　　　　　　　　and Thompson his
　　　　　　　　　　　Attorneys

UNITED STATES PATENT OFFICE.

FERDINAND SULZBERGER, OF NEW YORK, N. Y.

METHOD OF AND APPARATUS FOR RENDERING FATS, &c.

SPECIFICATION forming part of Letters Patent No. 262,706, dated August 15, 1882.

Application filed April 27, 1882. (No model.)

*To all whom it may concern:*

Be it known that I, FERDINAND SULZBERGER, of the city of New York, county and State of New York, have invented a new and useful Method of and Apparatus for Rendering Fats, &c., the resulting product being purer, sweeter, and freer from disagreeable odor and taste than the like products produced by other like apparatuses and processes, and the neighborhood is kept free from disagreeable or deleterious atmospheric impurities. This result is secured by catching and removing the gases, vapor, steam, &c., as soon as they come from the fat, and washing and condensing them.

My invention is especially applicable to the rendering of animal fats, and by its use a superior product can be obtained suitable for culinary purposes, and wherever sweet and pure rendered fats are desired, and all varieties of rendered fat are improved by my process.

The following is a full, clear, and exact description of my apparatus and process, having reference to the accompanying drawings.

*c* is the melting-tank in which the fat is put. I prefer to use live steam thrown directly into the fat as the heating medium; but it may be heated in any other known way.

*b* is a dome built upon the upper edge of the tank, and preferably the walls of it run vertically up for the distance (in a tank capable of melting, say, six thousand pounds) of about a foot and half, as shown at *b'*. It then contracts in the shape of an inverted funnel and terminates in a large pipe, *a*. In a tank capable of melting, say, six thousand pounds this pipe *a* should be preferably about a foot in diameter. This pipe *a* extends upward and connects with a suction-fan, (shown at *d* in Figure 2.) The pipe *a* is shown in this figure also. The suction-fan discharges into the pipe *e*, and within the pipe *e* the gases, &c., are brought into contact with a spray or jet of cold water thrown into it by the pipe *f*, on the end of which is a spray-nozzle. There may be several of these water-pipes *f*, one after the other, in the length of the pipe *e*, if desired, and the water is supplied to them from any convenient source. The spray-nozzle should be at the upper side of the pipe *e*.

*c'* is a door or shutter, which may be hinged to the sides of the dome, if desired, through which the tank can be charged and emptied.

The operation is this: As the fat is melted the steam, vapors, and gases which escape from the surface of the heated fat rise from it, are caught by the strong upward rush of air caused by the fan, and are carried up through the pipe *a* into the fan, and are by it thrown into the pipe *e* and into contact with the spray or jets of cold water which are supplied by the cold-water pipes *f*. The steam, vapors, and gases are thus, by contact with the cold water, condensed both while the water is in the form of a spray and also while running through the pipe *e*, which should be inclined so that the water may flow through it. The pipe *e* empties into a cold-water tank or else into the river beneath the surface of the water. The pipe *e* should preferably be so long that the condensation will be complete before the pipe terminates. By this means all pressure is prevented upon the surface of the hot fat, and all the gases, steam, and vapors which have heretofore been allowed to remain in contact with the fat for a longer or shorter time, depending upon the apparatus used, and thus, by condensation and contact, affecting the fat injuriously, are immediately upon their escape from the fat caught by the strong upward current induced by the fan and carried away.

The external air can enter the dome through the cracks around the door or shutter *c'*, and also through other openings in the dome made in the back part of the upright walls of the dome. These holes should be made low down in the walls, preferably just at the upper edge of the tank *c*, so that the draft will be induced as near the surface of the fat as may be.

I usually place the fan and the pipes *e* and *f* on the floor above the room in which the tank *c* is.

I do not claim such devices for rendering fats and similar bodies as that set forth in the patent to J. L. Alberger, dated November 30, 1858, No. 22,152.

I claim—

1. In a rendering apparatus, the combination of the tank *c*, the dome *b*, the pipe *a*, the fan *d*, the pipe *e*, and the pipe *f*, and suitable means for heating the tank *c* and rotating the fan $d$, substantially as and for the purposes set forth.

2. In a rendering apparatus, the combination of the tank $c$, the dome $b$, the pipe $a$, the fan $d$, the pipe $e$, and suitable means for heating the tank $c$ and rotating the fan $d$, substantially as and for the purposes set forth.

3. In a rendering apparatus, the combination of the tank $c$, the pipe $a$, the fan $d$, the pipe $e$, and the pipe $f$, and suitable means for heating the tank $c$ and rotating the fan $d$, substantially as and for the purposes set forth.

4. The process of rendering fats, consisting in melting the fat, catching the gases, vapors, steam, &c., drawing the same away as soon as they come from the surface of the fat by means of a partial vacuum created in the part of the apparatus where they are caught, and then condensing them, substantially as and for the purposes set forth.

FERDINAND SULZBERGER.

Witnesses:
JOHN H. IVES,
PHILLIPS ABBOTT.